Figure 1:
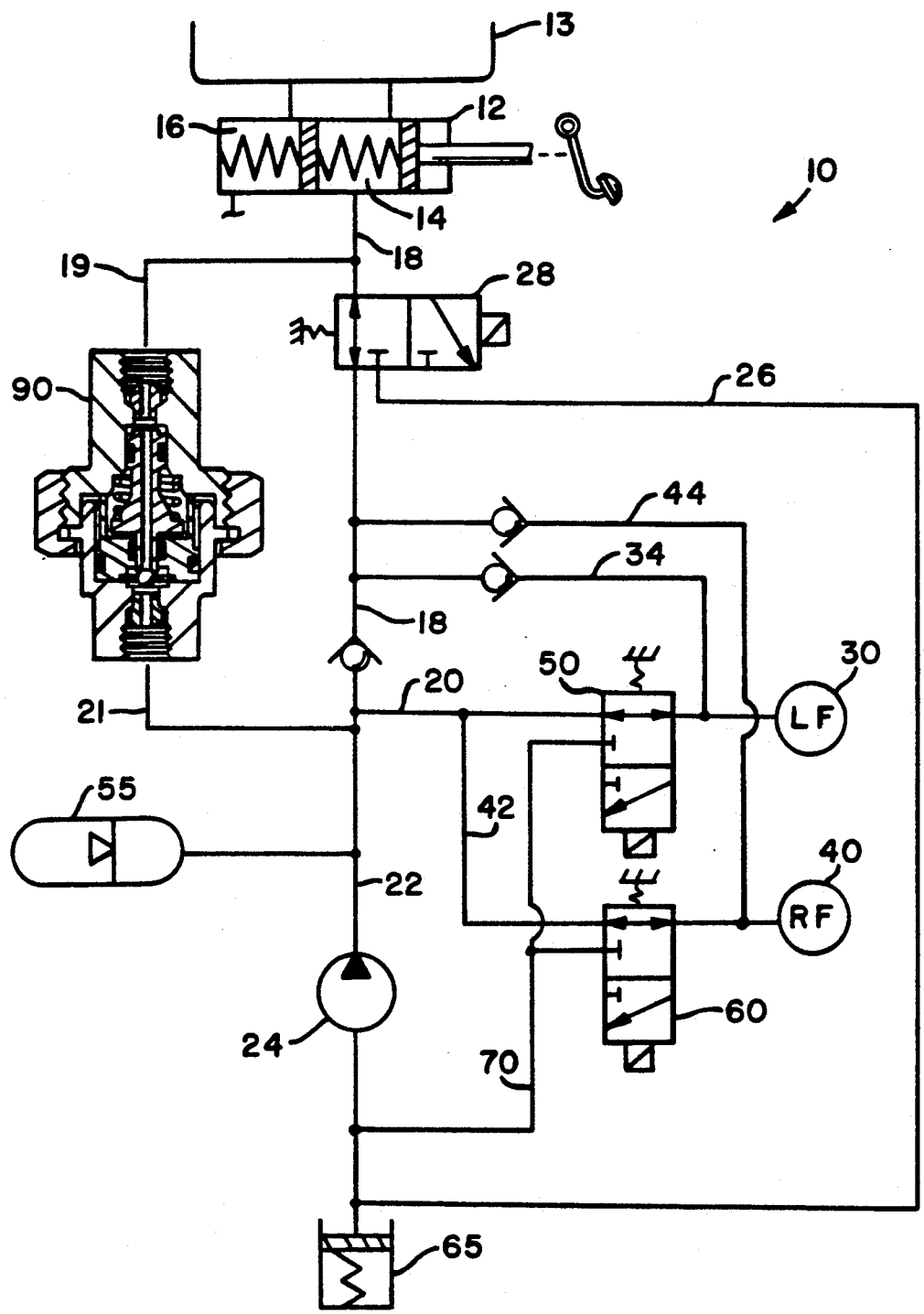

United States Patent [19]

Grana et al.

[11] Patent Number: 5,076,647

[45] Date of Patent: Dec. 31, 1991

[54] PILOTED PRESSURE RELIEF VALVE

[75] Inventors: Thomas A. Grana, South Bend, Ind.; William J. Penninger, Niles, Mich.

[73] Assignee: Allied-Signal Inc., Morristown, N.J.

[21] Appl. No.: 555,282

[22] Filed: Jul. 19, 1990

[51] Int. Cl.⁵ ................................................ B60T 8/32
[52] U.S. Cl. ........................... 303/113 TR; 137/508; 303/116 R; 303/68; 303/84.1
[58] Field of Search ............... 303/113-119, 303/100, 110, 84.1, 84.2, 28, 59, 60, 66, 67, 68, 69, 72, 79, 81, 86, 113 R, 113 TR, 113 TB, 116 R, 116 SP, 116 WP, 119 R; 137/508; 180/197

[56] References Cited

U.S. PATENT DOCUMENTS

| | | | |
|---|---|---|---|
| 2,839,078 | 6/1958 | Lornitzo | 137/508 |
| 4,887,638 | 12/1989 | Hellquist et al. | 137/508 X |
| 4,971,400 | 11/1990 | Jonner | 303/110 |

Primary Examiner—Douglas C. Butler
Attorney, Agent, or Firm—Larry J. Palguta; Ken C. Decker

[57] ABSTRACT

The piloted pressure relief valve (90) comprises a valve body (92) having a stepped bore (96) which receives a stationary bearing member (110) with a central through opening (117) through which extends a longitudinal extension (137) of a movable piston (130). The movable piston (130) has one end (133) sealingly received within a reduced diameter section (97) of the bore (96) and the opposite longitudinal extension (137) engages a valve member (154) captured between the bearing member (110) and a shoulder of the bore (96). The moveable piston (130) has a longitudinal through passage (132) permitting fluid flow therethrough when the piston (130) moves away from the valve member (154). A spring (140) disposed within the stepped bore (96) biases the piston (130) toward the valve member (154). The relief valve (90) enables a pumpback traction control system (10) to relieve fluid pressure buildup to the master cylinder (12) when a predetermined pressure limit is exceeded.

15 Claims, 2 Drawing Sheets

PILOTED PRESSURE RELIEF VALVE

The present invention relates generally to a piloted pressure relief valve, and in particular to a relief valve for a pumpback traction control system.

Many automotive vehicles are now being equipped with adaptive braking systems. Once an adaptive braking system is provided for a vehicle, it is relatively inexpensive to provide a small amount of further hardware and additional software in order to include the feature of traction control. During traction control operation, the system automatically applies and releases the appropriate vehicle brakes so that the wheels do not spin excessively relative to the road surface and the vehicle lose traction. In a pumpback traction control system, the pump when energized for operation provides fluid pressure to the solenoid valves which communicate with the vehicle brakes, and typically the pump may provide more fluid than the braking system requires for traction control. This additional fluid is absorbed within the accumulator, and the accumulator may become saturated such that the pump builds up a larger than needed pressure (as great as nearly 3000 psi head pressure). The result is that when traction control operation ceases the relieving of pressure toward the master cylinder takes much longer than desired. Thus, the restoration of normal brake operation to the system is delayed, and if there is a sudden need for adapative braking system operation, the excess volume of fluid within the system may provide a temporary blockage of fluid pressure transmitted by the master cylinder so that braking is affected. It is highly desireable to provide a pressure relief mechanism which will enable excess fluid pressure created by the pump during traction control to be relieved to the master cylinder, so that when traction control operation terminates the time required for the relief of fluid pressure within the system is reduced to an optimum value.

The present invention provides solutions to the above problems by providing a piloted pressure relief valve, comprising a body having therein a stepped bore, the bore having first and second end openings, a bearing member disposed stationarily within said bore and the bearing member having a central through opening, a fluid flow valve member disposed adjacent said central through opening and having fluid flow restriction openings disposed adjacent the valve member, moveable piston means disposed within said bore and having a longitudinal passage, a first end of the piston means extending through the central through opening of said bearing member, and the first end having a first end opening comprising a valve seat that engages said valve member, sealing means disposed within said central through passage and about said first end of the piston means, a second end of the piston means received sealingly within the stepped bore and having a second end opening of the longitudinal passage communicating with the second end opening of the bore, and resilient means disposed between said body and piston means, such that fluid pressure received at said second end opening of the bore urges said piston means in to engagement with said valve member so that fluid cannot communicate between the second and first end openings of the bore, and fluid pressure received at the first end opening of the bore and passing through said flow restriction openings able to effect, at a predetermined pressure, displacement of said piston means toward said second end opening of the bore so that the valve seat displaces from said valve member and permits fluid communication through said longitudinal passage.

Figure 2:
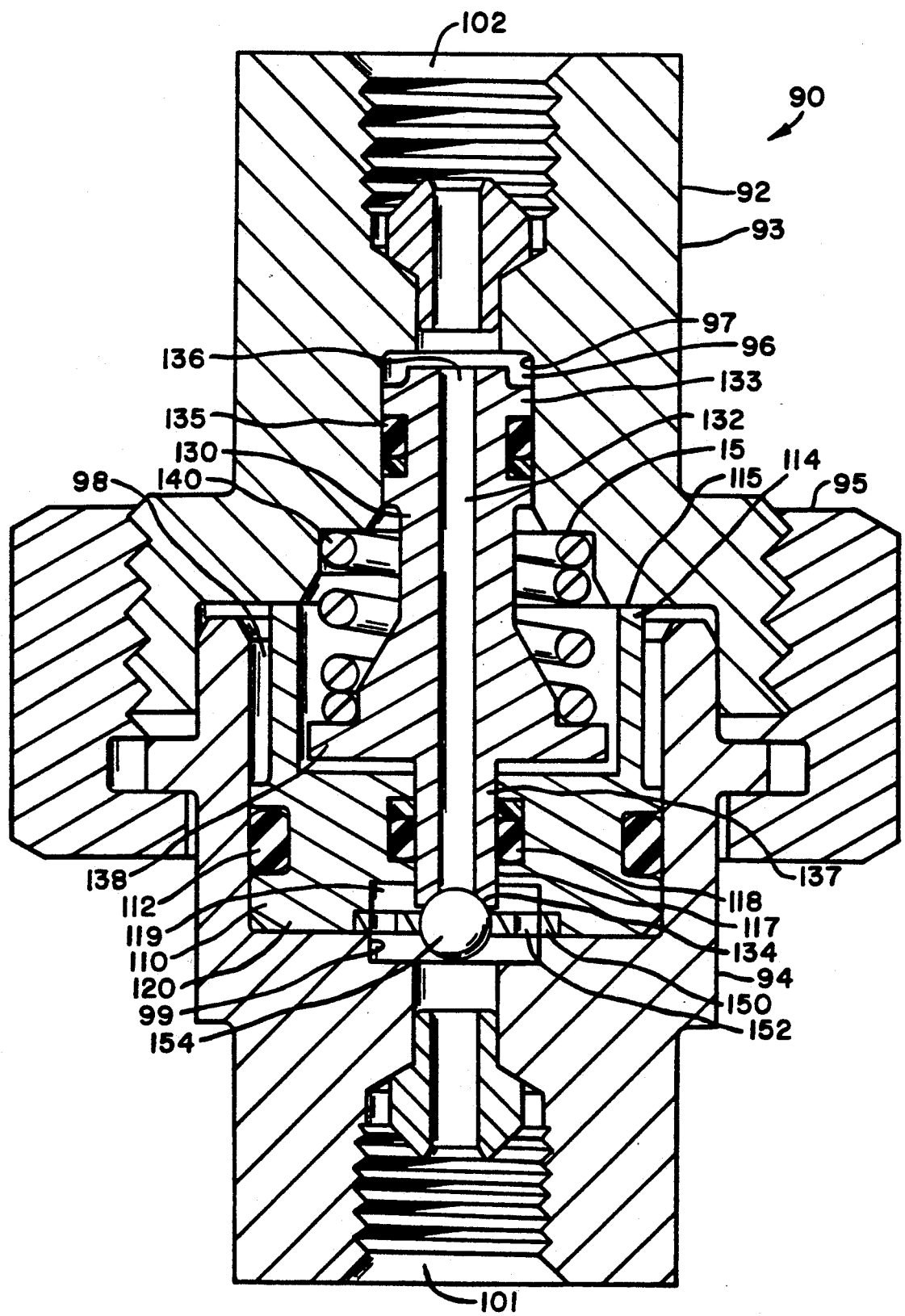

One way of carrying out the invention is described in detail below with reference to the drawings which illustrate an embodiment in which:

FIG. 1 is a schematic illustration of a portion of an adaptive braking and traction control system; and FIG. 2 is an enlarged section view of the piloted pressure relief valve illustrated in the system of FIG. 1.

FIG. 1 is a schematic illustration of a portion of an adaptive braking and traction control system indicated generally by reference numeral 10. System 10 comprises a typical master cylinder 12 having a primary pressure chamber 14 and a secondary pressure chamber 16. The primary chamber 14 communicates via line connection 18 with line 20 connected with the left front vehicle wheel 30. Line connection 18 also communicates with line 22 having therein a pump 24 which communicates with a traction control feed line 26. Traction control feed line 26 extends between pump 24 and an electromagnetic solenoid isolation valve 28. Valve 28 is a two-position, three-way valve which isolates the master cylinder during adaptive braking system and traction control system operation. Line 20 also connects with line 42 that communicates with the right front wheel 40. Disposed within line 20 is a build/decay electromagnetic solenoid valve 50, and disposed within line 42 is a build/decay electromagnetic solenoid valve 60. Each valve 50, 60 comprises a two-positon, three-way solenoid valve which in its normally deactivated position permits fluid flow for normal braking. When activated, the valve permits fluid pressure at the wheel brake to decay away from the wheel brake to line 70 which communicates with the intake side of pump 24. Wheel brakes 30 and 40 also may relieve braking pressure towards the master cylinder 12 via the relief bypass lines 34 and 44. An accumulator 55 communicates with line 22 to receive excess fluid within the system, and also to provide fluid pressure when it is needed. A sump 65 communicates with lines 26 and 70 to absorb excess fluid within the system.

Line connection 18 communicates the primary pressure chamber 14 of master cylinder 12 with a relief line 19 which communicates with the piloted pressure relief valve 90 of the present invention, valve 90 connected with line 21 that communicates with lines 22 and 20. Relief valve 90 provides for the relief of fluid pressure within lines 20, 22 and at the accumulator 55 when the pressure exceeds a predetermined pressure level, such that the pressure is relieved toward the master cylinder which communicates the fluid pressure to reservoir 13.

FIG. 2 illustrates a section view of the piloted pressure relief valve 90. Valve 90 comprises a valve body 92 consisting of an upper valve body 93 and a lower valve body 94 connected together by a threaded spanner nut 95. Stepped bore 96 within valve body 92 includes a reduced diameter section 97, an enlarged diameter section 98, and a reduced diameter valve section 99. Stepped bore includes a first end opening 101 and a second end opening 102 each of which communicates fluid pressure to the stepped bore. Located within stepped bore 96 is a bearing member 110 which includes thereabout a seal 112 which sealingly engages the surface of enlarged diameter section 98, and bearing member 110 includes a cup-shaped end 114 which engages stepped bore shoulder 115 so that bearing member 110 is disposed stationary within stepped bore 96. Bearing member 110 includes a central opening 117 which includes sealing means 118. A valve recess 119 is disposed at a first end 120 of bearing member 110 and opposite valve section 99 of stepped bore 96. Located within stepped bore 96 is a piston 130 having a longitudinal through passage 132 communicating with a first end opening 134 at longitudinal extension 137 and a second end opening 136 at a second end 133. First end opening 134 comprises a coined valve seat. Piston 130 includes the second end 133 having sealing means 135 engaging the surface of bore section 96, and an enlarged diameter shoulder 138 providing a seat for resilient means 140 extending between bore shoulder 15 and shoulder 138 to bias the piston towards first end opening 101. A valve member 150 comprises an annular disc having a plurality of fluid flow restriction openings 152 disposed about a centrally located ball valve member 154. Centrally disposed ball valve member 154 is engaged by valve seat 134 to prevent fluid flow through the longitudinal through passage 132. The longitudinal extension 137 of piston 130 is engaged sealingly by sealing means 118.

Referring to FIGS. 1 and 2, during adaptive braking system operation the accumulator 55 is permitted to store fluid. Because adaptive braking system operation occurs only when the vehicle driver is braking, pressurized fluid is present in master cylinder 12. This master cylinder pressure is transmitted via line connection 18 and line 19 to the second end opening 102 of relief valve 90. The master cylinder Pressure is imposed on the relatively large area at second end 133 of piston 130 adjacent second end opening 136. Such a hydraulic force in addition to the spring force cf resilient means 140 will keep valve seat 134 of piston 130 engaged with ball valve member 154 so that adaptive braking system operation is not affected by the valve. The valve remains closed during adaptive braking system operation. Also, during non-adaptive braking system operation, because of the fluid pressure generated within the master cylinder 12, relief valve 90 is not activated.

During traction control system operation, the vehicle driver is accelerating the vehicle and would not be applying braking pressure to braking system 10. Therefore, no hydraulic pressure will be generated within master cylinder 12 and communicated to second end opening 102 of relief valve 90. When traction control system operation commences, the pump 24 is activated concurrent with the activation of isolation valve 23. Thus, pump 24 draws fluid from reservoir 13 via master cylinder 12, connection 18 and line 26, and communicates it via lines 22, 20, and 42 to the wheel brakes 30, 40. Because the pump will provide hydraulic fluid and pressure in excess of what the wheel brakes 30 and 40 need for application of the brakes during traction control operation, a high fluid pressure buildup will occur within the system unless it is relieved. When a predetermined pressure threshold, such as 1100 psi, is reached at accumulator 55, the hydraulic pressure transmitted via line 21 to relief valve 90 causes piston 130 to move away from ball valve member 154 by overcoming the force of resilient means 140. Thus, valve seat 134 is opened and fluid pressure within the system is relieved via the through passage 132, second end opening 102, line 19 and connection 18 to master cylinder 12 and reservoir 13. Because the accumulator does not begin storing fluid until a knee point such as 2200 psi is exceeded, accumulator 55 will not store fluid pressure during traction control system operation. More importantly, fluid pressure is relieved from the system during traction control operation and thus prevents accumulator saturation and also avoids the unacceptably long shutdown sequence during which the high fluid pressure would have to be relieved from the system to the master cylinder reservoir. Because typical traction control operation events usually require a hydraulic pressure of approximately 400 psi and never require greater than 700 psi, relieving the fluid pressure buildup effected by pump 24 at a threshold of 1100 psi will not impact traction control performance. Thus, piloted pressure relief valve 90 provides a mechanism by which excess fluid pressure provided by pump 24 may be relieved to the master cylinder reservoir during traction control operation, so that subsequent to the termination of traction control operation, the period during which fluid pressure is relieved to the brakes is reduced to an optimum value and the brake system is more quickly made ready for normal braking or any commencement of adaptive braking system operation.

We claim:

1. A piloted pressure relief valve, comprising a body having therein a stepped bore, the bore having first and second end openings, a bearing member disposed stationarily within said bore and the bearing member having a central through opening, the bearing member having at an end adjacent the first opening a fluid flow valve member and a fluid restrictor comprising a valve member connected with said bearing member and having fluid flow restriction openings disposed adjacent the valve member, a seal disposed between said bearing member and adjacent surface of the bore, a moveable piston disposed within said bore and having a longitudinal passage, a first end of the piston comprising a reduced diameter extension extending through the central through opening of said bearing member, and the extension having a first end opening of the longitudinal passage and which is a valve seat that engages said valve member, sealing means disposed within said central through passage and about said extension of the piston, a second end of the piston received sealingly within a section of the stepped bore and having a second end opening of the longitudinal passage communicating with the second end opening of the bore, and resilient means disposed between said body and said piston, such that fluid pressure received at said second opening causes said piston to remain in engagement with said valve member so that fluid cannot communicate between the second and first end openings of the bore, and fluid pressure received at the first end opening and passing through said flow restriction openings is able to effect, at a predetermined pressure, displacement of said piston toward said second end opening of the bore so that the valve seat displaces from said valve member and permits fluid communication through said longitudinal passage and to said second end opening of the bore, and the relief valve disposed within a traction control system so that fluid may flow from said system and toward an associated master cylinder during operation of said traction control system.

2. The valve in accordance with claim 1, wherein the piston includes an enlarged diameter shoulder which serves as a seat for said resilient means.

3. The valve in accordance with claim 1, wherein the valve member comprises a disc having at a central area an annular member engaged by said valve seat.

4. The valve in accordance with claim 3, wherein the body comprises two body parts coupled together by threaded means.

5. The valve in accordance with claim 1, wherein the bearing member comprises a cup-shaped second end which receives therein the piston and which engages a shoulder of the stepped bore such that the bearing member is disposed fixedly within said stepped bore.

6. The valve in accordance with claim 5, wherein said valve member comprises a stationary member engaged by the moveable piston, the stationary member captured between said bearing member and an adjacent shoulder of said stepped bore.

7. The valve in accordance with claim 1, wherein the bearing member has an end recess disposed opposite a small diameter area of said bore to define a valve chamber wherein the valve member is disposed.

8. A piloted pressure relief valve, comprising a body having therein a stepped bore, the bore having first and second end openings, a bearing member disposed stationarily within said bore and the bearing member having a central through opening, a fluid flow valve member disposed adjacent said central through opening and having fluid flow restriction openings disposed adjacent the valve member, moveable piston means disposed within said bore and having a longitudinal passage, a first end of the piston means extending through the central through opening of said bearing member, and the first end of the piston means having a first end opening comprising a valve seat that engages said valve member, sealing means disposed within said central through passage and about said first end of the piston means, a second end of the piston means received sealingly within the stepped bore and having a second end opening of the longitudinal passage communicating with the second end opening of the bore, and resilient means disposed between said body and piston means, such that fluid pressure received at said second end opening of the bore urges said piston means into engagement with said valve member so that fluid cannot communicate between the second and first end openings of the bore, and fluid pressure received at the first end opening of the bore and passing through said flow restriction openings able to effect, at a predetermined pressure, displacement of said piston means toward said second end opening of the bore so that the valve seat displaces from said valve member and permits, fluid communication through said longitudinal passage, and the relief valve disposed within a traction control system so that fluid may flow from said system and toward an associated master cylinder during operation of said traction control system.

9. The valve in accordance with claim 8, wherein the piston means includes an enlarged diameter shoulder which serves as a seat for said resilient means.

10. The valve in accordance with claim 9, wherein the valve member comprises a disc having at a central area an annular member engageable by said valve seat.

11. The valve in accordance with claim 10, wherein the body comprises two body parts coupled together by threaded means.

12. The valve in accordance with claim 8, wherein the bearing member comprises a cup-shaped second end which receives therein the piston means and which engages a shoulder of the stepped bore such that the bearing member is disposed fixedly within said stepped bore.

13. The valve in accordance with claim 12, wherein said valve member comprises a stationary member engageable by the moveable piston means, the stationary member captured between said bearing member and an adjacent shoulder of said stepped bore.

14. The valve in accordance with claim 8, wherein the bearing member has an end recess disposed opposite a small diameter area of said bore to define a valve chamber wherein the valve member is disposed.

15. The valve in accordance with claim 8, wherein the relief valve is disposed in a line that bypasses an isolation valve for the master cylinder.

* * * * *